United States Patent
Ohyama et al.

(10) Patent No.: US 9,761,163 B2
(45) Date of Patent: Sep. 12, 2017

(54) IMAGE DISPLAY APPARATUS

(71) Applicant: JVC KENWOOD Corporation, Yokohama-shi (JP)

(72) Inventors: Minoru Ohyama, Yokohama (JP); Kazumi Iwata, Yokohama (JP); Ryuichi Okazaki, Yokohama (JP); Tatsuya Nakano, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 147 days.

(21) Appl. No.: 14/750,519

(22) Filed: Jun. 25, 2015

(65) Prior Publication Data

US 2015/0294609 A1 Oct. 15, 2015

Related U.S. Application Data

(63) Continuation of application No. PCT/JP2013/081817, filed on Nov. 26, 2013.

(30) Foreign Application Priority Data

Jan. 4, 2013 (JP) ................................. 2013-000062

(51) Int. Cl.
*G09G 3/02* (2006.01)
*G02B 26/08* (2006.01)
(Continued)

(52) U.S. Cl.
CPC ........... *G09G 3/025* (2013.01); *G02B 26/085* (2013.01); *G02B 26/101* (2013.01);
(Continued)

(58) Field of Classification Search
CPC G02B 26/085; G02B 26/101; G02B 27/0101; G09G 3/3406; G09G 3/025;
(Continued)

(56) References Cited

U.S. PATENT DOCUMENTS 7,715,103 B2 5/2010 Sprague et al.
9,159,291 B2 * 10/2015 Yamazaki ................ G09G 3/20
(Continued)

FOREIGN PATENT DOCUMENTS

EP 2271121 A2 1/2011
JP 05-008661 A 1/1993
(Continued)

OTHER PUBLICATIONS

International Search Report in PCT International Application No. PCT/JP2013/081817, dated Feb. 10, 2014.
(Continued)

*Primary Examiner* — Vihn Lam
(74) *Attorney, Agent, or Firm* — Venable LLP; Michael A. Sartori; Laura G. Remus

(57) ABSTRACT

An image display apparatus includes a laser light source unit configured to output a luminous flux, a scanning mirror unit configured to reflect the luminous flux by reciprocating driving in a main-scanning direction and a sub-scanning direction, a light source driving unit configured to drive the light source unit based on image data, a bit shift processing unit configured to adjust a brightness value of a pixel included in the image date, and a dimming processing unit configured to perform control in such a manner that a brightness value of a pixel included in the image data is not displayed as zero with respect to the image data subjected to dimming processing by the bit shift processing unit according to a predetermined rule.

5 Claims, 12 Drawing Sheets

(51) Int. Cl.
*G02B 26/10* (2006.01)
*G02B 27/01* (2006.01)
*G09G 3/34* (2006.01)
*H04N 9/31* (2006.01)

(52) U.S. Cl.
CPC ....... *G02B 27/0101* (2013.01); *G09G 3/3406* (2013.01); *H04N 9/3129* (2013.01); *H04N 9/3182* (2013.01); *H04N 9/3188* (2013.01); *B60K 2350/2052* (2013.01); *G09G 2320/0626* (2013.01); *G09G 2360/144* (2013.01); *G09G 2380/10* (2013.01)

(58) Field of Classification Search
CPC ..... G09G 2320/0626; G09G 2360/144; G09G 2380/10; B60K 2350/2052; H04N 9/3182; H04N 9/3129; H04N 9/3188
USPC .................. 345/690, 697, 214, 7–9, 32, 42; 359/13–17
See application file for complete search history.

(56) References Cited

U.S. PATENT DOCUMENTS

| | | | | |
|---|---|---|---|---|
| 9,417,732 | B2* | 8/2016 | Kim | G06F 3/0421 |
| 2001/0008394 | A1* | 7/2001 | Kanamori | G02B 27/01 |
| | | | | 345/7 |
| 2009/0147224 | A1 | 6/2009 | Kurozuka et al. | |
| 2010/0289632 | A1* | 11/2010 | Seder | G01S 13/723 |
| | | | | 340/436 |
| 2012/0162272 | A1* | 6/2012 | Lee | G09G 5/10 |
| | | | | 345/690 |
| 2012/0169777 | A1 | 7/2012 | Budni et al. | |
| 2013/0241971 | A1* | 9/2013 | Sekiya | G02B 26/101 |
| | | | | 345/690 |
| 2014/0152711 | A1* | 6/2014 | Sekiya | G03B 21/00 |
| | | | | 345/690 |
| 2015/0042693 | A1* | 2/2015 | Hirata | G09G 3/3659 |
| | | | | 345/690 |

FOREIGN PATENT DOCUMENTS

| | | | | |
|---|---|---|---|---|
| JP | 07-287550 | A | 10/1995 | |
| JP | 2002-344765 | A | 11/2002 | |
| JP | 2008-089934 | A | 4/2008 | |
| JP | 2008089934 | * | 4/2008 | ............ G02B 27/02 |
| JP | 2009-230079 | A | 10/2009 | |
| JP | 2010-539525 | A | 12/2010 | |

OTHER PUBLICATIONS

Fisher et al.,"Bitshift Operators," Hypermedia Image Processing Reference, Jan. 1, 2003, pp. 1-5 [online][retrieved Sep. 15, 2016] Retrieved from the Internet <URL:http://homepages.inf.ed.ac.uk/rbf/HIPR2/bitshift.htm.

Extended European Search Report in counterpart European Patent Application No. 13870294.9, dated Oct. 4, 2016.

* cited by examiner

FIG.8

| ASSUMED ENVIRONMENT | RELATIVE BRIGHT-NESS | LIGHT ADJUST-MENT LEVEL | NEUTRAL DENSITY (ND) FILTER | | LIGHT SOURCE DRIVING UNIT | | DIGITAL ARITHMETIC PROCESSING | | | DIMMING PROCESSING | LIGHT ADJUSTMENT GAIN |
|---|---|---|---|---|---|---|---|---|---|---|---|
| | | | FILTER ON/OFF | GAIN | NUMBER OF DOWN SHIFTS | SHIFT GAIN | | NUMBER OF BIT SHIFTS | SHIFT GAIN | | |
| EMERGENCY ALARM | 32768 | 16 | OFF | 1 | 0 | 1.0000 | | | | | 64.000000000 |
| SNOWY ROAD ON SUNNY DAY | 16384 | 15 | OFF | 1 | 1 | 0.5000 | | | | | 32.000000000 |
| SUNNY DAY IN SUMMER | 8192 | 14 | OFF | 1 | 2 | 0.2500 | | | | | 16.000000000 |
| | 4096 | 13 | ON | 0.125 | 0 | 1.0000 | UP | 3 | 8 | | 8.000000000 |
| | 2048 | 12 | ON | 0.125 | 1 | 0.5000 | UP | 3 | 8 | | 4.000000000 |
| | 1024 | 11 | ON | 0.125 | 2 | 0.2500 | UP | 3 | 8 | | 2.000000000 |
| AVERAGE IN DAYTIME | 512 | 10 | ON | 0.125 | 3 | 0.1250 | UP | 3 | 8 | | 1.000000000 |
| | 256 | 9 | ON | 0.125 | 4 | 0.0625 | UP | 3 | 8 | | 0.500000000 |
| DUSK | 128 | 8 | ON | 0.125 | 4 | 0.0625 | UP | 3 | 8 | | 0.250000000 |
| | 64 | 7 | ON | 0.125 | 4 | 0.0625 | UP | 2 | 4 | | 0.125000000 |
| DOWNTOWN AT NIGHT | 32 | 6 | ON | 0.125 | 4 | 0.0625 | UP | 1 | 2 | | 0.062500000 |
| | 16 | 5 | ON | 0.125 | 4 | 0.0625 | UP | 0 | 1 | | 0.031250000 |
| SUBURB AT NIGHT | 8 | 4 | ON | 0.125 | 4 | 0.0625 | DOWN | 1 | 0.5 | | 0.015625000 |
| | 4 | 3 | ON | 0.125 | 4 | 0.0625 | DOWN | 2 | 0.25 | | 0.007812500 |
| MOUNTAIN AT NIGHT | 2 | 2 | ON | 0.125 | 4 | 0.0625 | DOWN | 3 | 0.125 | | 0.003906250 |
| | 1 | 1 | ON | 0.125 | 4 | 0.0625 | DOWN | 4 | 0.0625 | | 0.001953125 |
| | 0.5 | SP1 | ON | 0.125 | 4 | 0.0625 | DOWN | 5 | 0.03125 | FIRST DIMMING PROCESSING | 0.000976563 |
| | 0.25 | SP2 | ON | 0.125 | 4 | 0.0625 | DOWN | 5 | 0.03125 | SECOND DIMMING PROCESSING | 0.000488281 |

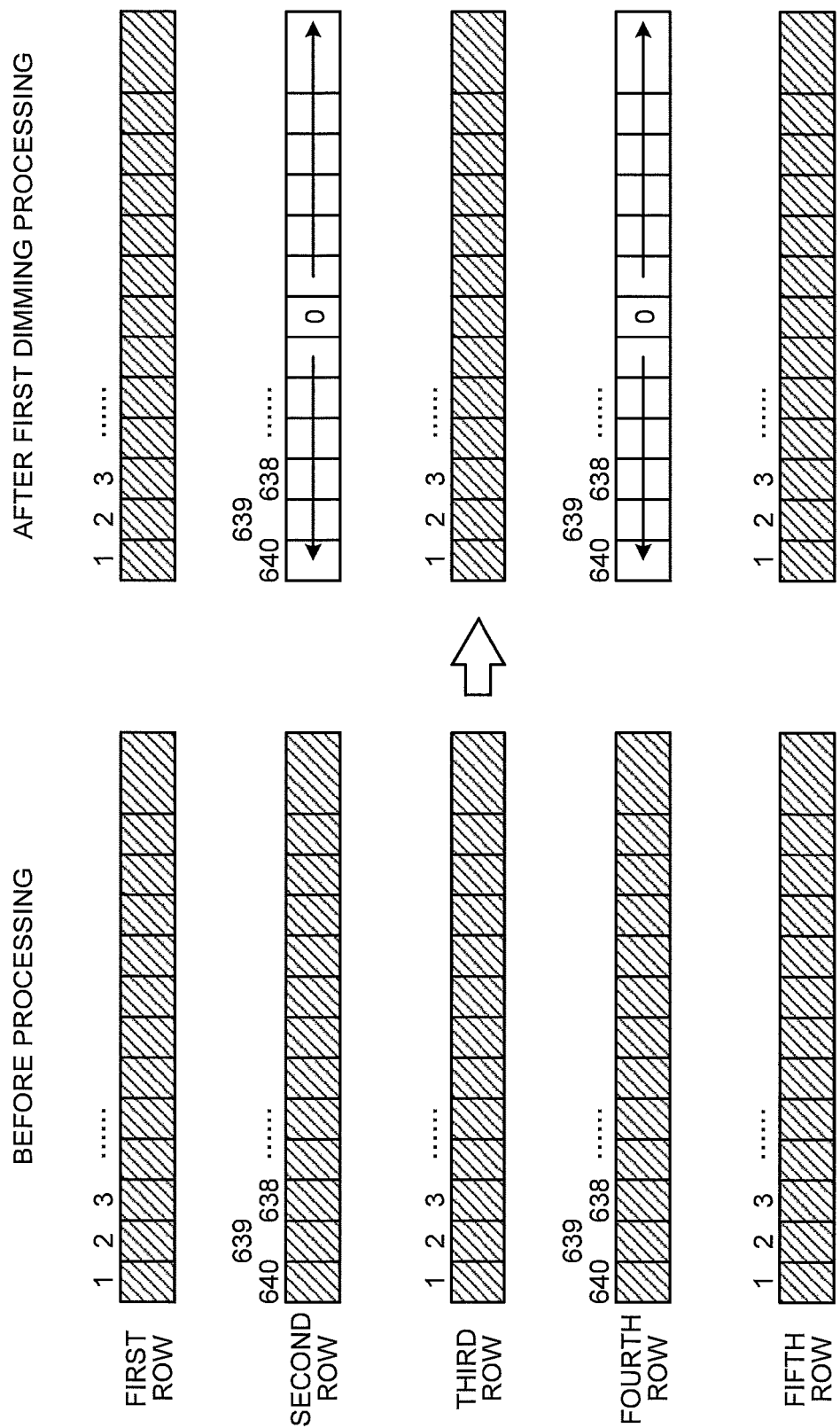

IMAGE DISPLAY APPARATUS

CROSS-REFERENCE TO RELATED APPLICATION

This application is a continuation of PCT international application Ser. No. PCT/JP2013/081817 filed on Nov. 26, 2013 which designates the United States, incorporated herein by reference, and which claims the benefit of priority from Japanese Patent Application No. 2013-000062, filed on Jan. 4, 2013, incorporated herein by reference.

BACKGROUND OF THE INVENTION

1. Field of the Invention

The present invention relates to an image display apparatus.

2. Description of the Related Art

An image display apparatus to reflect a laser beam with a scanning mirror and to display an image on a projection surface by raster scanning with a beam has been known (see, for example, Patent Literature 1: JP 2010-539525 W). That is, a laser scanning type projection display draws a scanning line in a horizontal direction by making a scanning mirror perform reciprocating oscillation to the right and left. At the same time, the laser scanning type projection display makes the scanning mirror perform reciprocating oscillation in a vertical direction for the number of scanning lines included in an image.

The laser scanning type image display apparatus is used, for example, in a vehicle. In an in-vehicle image display apparatus, a video is displayed through a windscreen or a combiner in front of a driver (see, for example, Patent Literature 2: JP 5-8661 A). Accordingly, an image luminous flux emitted from the image display apparatus and external light transmitted through the windscreen are overlaid (superimposed) and enter an eye of the driver. Thus, the driver is able to see video information and a situation in front of him/her simultaneously.

Since being small and portable, an image display apparatus is expected to be used in various kinds of environment. For example, usage in environment with various levels of brightness is expected. Thus, it is desired to make it possible to perform adjustment of a wide range of light adjustment level, specifically, adjustment at low luminance in detail.

SUMMARY OF THE INVENTION

It is an object of the present invention to at least partially solve the problems in the conventional technology.

The present invention provides an image display apparatus that includes a laser light source unit configured to output a luminous flux, a scanning mirror unit configured to reflect the luminous flux by reciprocating driving in a main-scanning direction and a sub-scanning direction, a light source driving unit configured to drive the light source unit based on image data, a bit shift processing unit configured to adjust a brightness value of a pixel included in the image date, and a dimming processing unit configured to perform control in such a manner that a brightness value of a pixel included in the image data is displayed as zero with respect to the image data subjected to dimming processing by the bit shift processing unit according to a predetermined rule.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a view illustrating an example of a list of light adjustment levels;

FIG. 9 is a view illustrating a state in which image data in a scanning line corresponding to a returning path is thinned by first dimming processing;

DETAILED DESCRIPTION OF THE PREFERRED EMBODIMENTS

Figure 1:
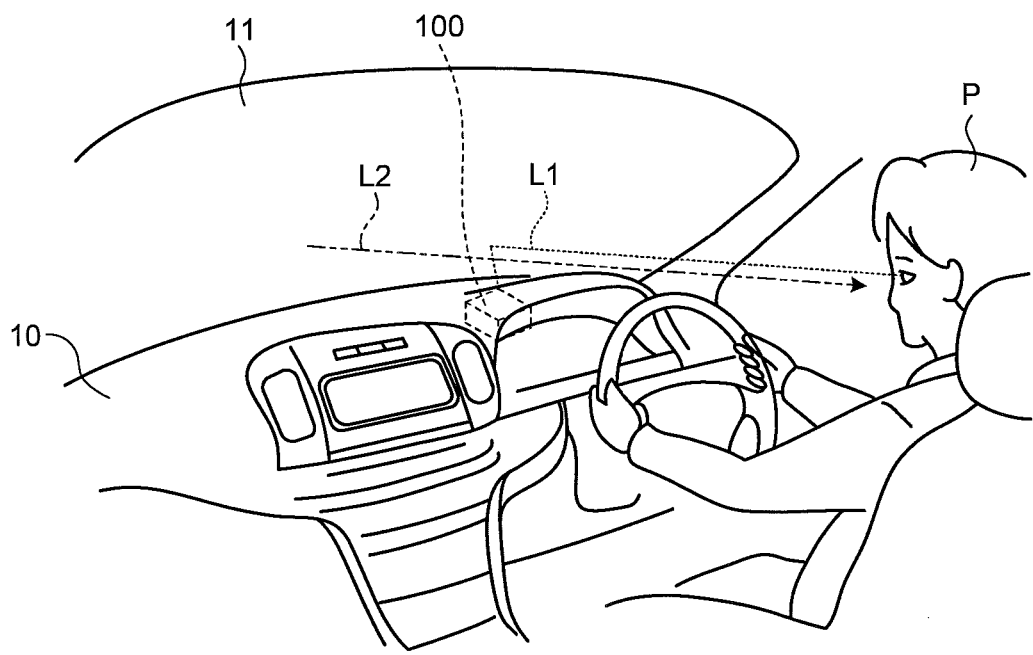
FIG. 1 is a view illustrating a typical usage example of an image display apparatus.

An embodiment of the present invention will be illustrated and a description will be made with reference to a reference sign assigned to each element in the drawings.

First Embodiment

A first embodiment of an image display apparatus of the present invention will be described. FIG. 1 is a view illustrating a typical usage example of an image display apparatus 100 assumed in the present invention. The image display apparatus 100 reflects a laser beam with a scanning mirror and displays (draw) an image on a projection surface by raster scanning with a beam. In FIG. 1, the image display apparatus 100 is mounted on an automobile 10. From the image display apparatus 100, an image luminous flux L1 adjusted to display an intended image is emitted (output). The image luminous flux L1 is reflected on a windscreen 11, enters an eye of a driver P, and forms an image on a retina. Simultaneously, external light L2 enters and passes through the windscreen 11. Thus, the external light L2 and the image luminous flux L1 from the image display apparatus 100 are overlaid (superimposed) and an actual external view and an image emitted from the image display apparatus 100 can be seen simultaneously in a field of view of the driver P.

Figure 2:
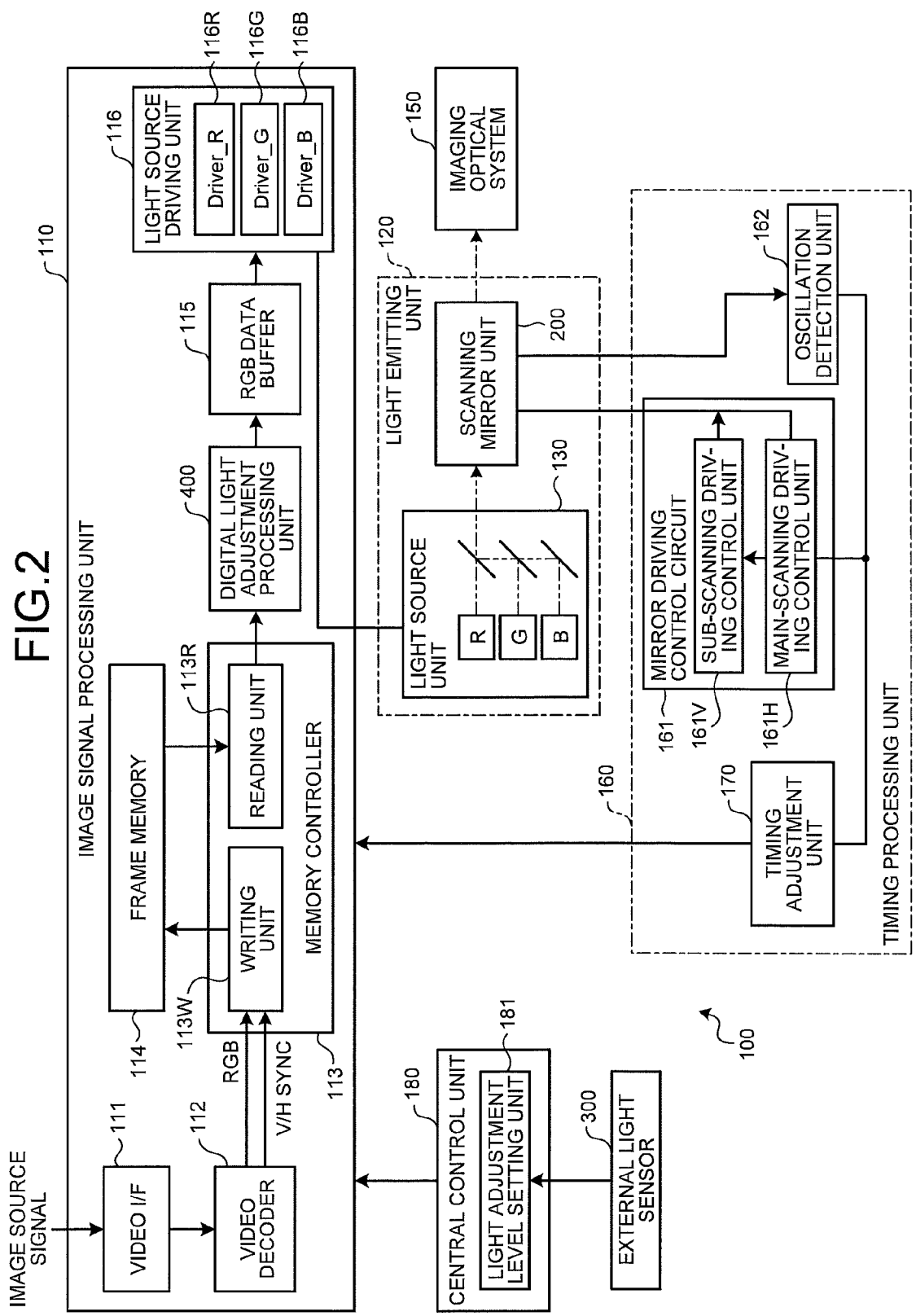
FIG. 2 is a functional block diagram illustrating an entire configuration of the image display apparatus.

FIG. 2 is a functional block diagram illustrating an entire configuration of the image display apparatus 100. The image display apparatus 100 includes an image signal processing unit 110, a light emitting unit 120, an imaging optical system 150, a timing processing unit 160, and a central control unit 180. A configuration and an operation of each function unit will be described in the following.

The image signal processing unit 110 includes a video interface 111, a video decoder 112, a memory controller 113, a frame memory 114, a data buffer 115, a light source driving unit 116, and a digital light adjustment processing unit 400.

An original image signal is input through the video interface 111. As an image source, there is no limitation and various kinds are considered. For example, there is an image signal from a car navigation apparatus or a speed display signal from a vehicle. Also, in some cases, an image reproduction signal read from a television broadcast or a recording medium or the like is considered. The video decoder 112 performs decoding processing of the original image signal according to an image type. For example, when the original image signal is an analog image signal (component video signal), the original image signal is separated, by the decoding processing, into a digital image signal including three digital color signals (RGB) and a synchronization signal including a horizontal synchronization signal and a vertical synchronization signal.

Figure 3:
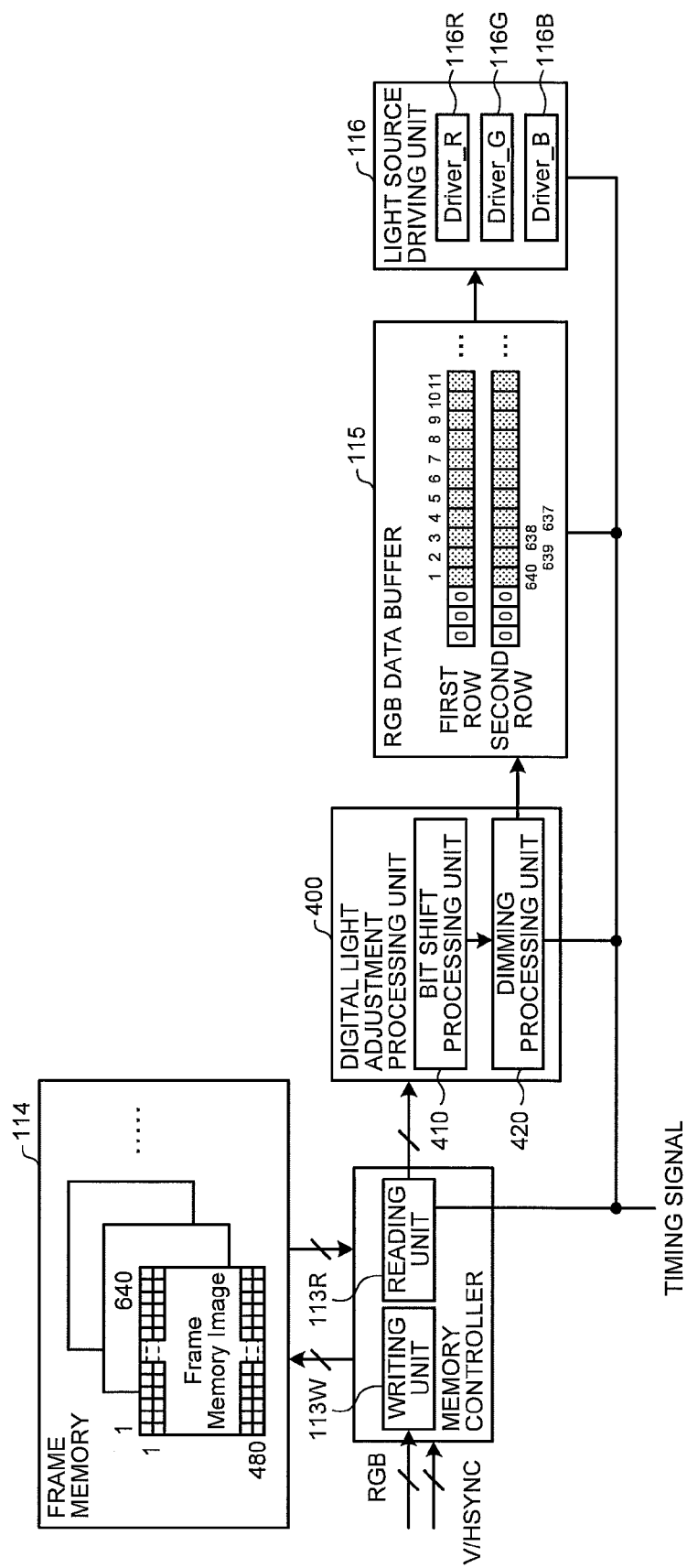
FIG. 3 is a view illustrating a flow of processing of a video signal.

The memory controller 113 includes a writing unit 113W and a reading unit 113R. FIG. 3 is a view illustrating a flow of processing of a video signal. The writing unit 113W temporarily writes and buffers the video signal, which is processed in the video decoder 112, into a frame memory 114. Then, the reading unit 113R reads image data by one line of the main-scanning line from the frame memory 114 based on a designated dot clock.

Here, the reading unit 113R reads the image data at timing suitable for a laser scanning type projection display and outputs the read image data to the following stage. That is, the reading unit 113R reads the image data in response to a timing signal adjusted in the timing processing unit 160 (dot clock or display period instruction signal). The image data read in such a manner is output to the digital light adjustment processing unit 400.

Here, a scanning mirror unit 200 performs drawing in both of a going path and a returning path during reciprocating oscillation in a horizontal direction (main-scanning driving direction). Thus, when reading image data corresponding to the going path of the main-scanning driving, the reading unit 113R reads the image data in an order of an address. However, when reading image data corresponding to the returning path of the main-scanning driving, the reading unit 113R reads the image data in an opposite order of the address. That is, in the returning path of the main-scanning driving, a drawing point moves from the right to the left. Thus, when the image data is transmitted to the light source driving unit 116 in an order read in the opposite order and light emission driving of a semiconductor laser diode is performed, it is possible to display an image also in the returning path of the main-scanning driving.

With respect to the image data output from the reading unit 113R, the digital light adjustment processing unit 400 performs brightness adjustment of the image by the digital arithmetic processing. As the image data, for example, there is an image signal from a car navigation apparatus or a speed display signal from a vehicle. Also, in some cases, an image reproduction signal read from a television broadcast or a recording medium or the like is considered. Here, when brightness of the surrounding environment is too high such as in a case of a snowy road on a sunny day or when brightness is too low such as in a case of a mountain at night, there is a case where it is difficult for a user to see an image. Conceptually, when the surrounding environment is too bright, the digital light adjustment processing unit 400 increases luminance of an image signal and displays a video. Also, when the surrounding environment is too dark, the digital light adjustment processing unit 400 decreases luminance of the image signal and displays the video.

The digital light adjustment processing unit 400 includes a bit shift processing unit 410 and a dimming processing unit 420. The bit shift processing unit 410 increases/decreases a luminance value of each pixel in an image signal by a bit shift operation. In such a bit shift operation, an already-known technique may be used. For example, as illustrated in a table in FIG. 8, a shift gain can be changed from 8 to 0.03125 by bit shift processing. However, as described later, in order to keep gradation at low luminance and to secure the number of light adjustment levels, processing not to display a pixel by a predetermined rule is performed along with adjustment of laser beam emission intensity by a bit shift.

The dimming processing unit 420 performs processing to further decrease brightness of the image on which dimming processing is performed by the bit shift processing unit 410. Since the dimming processing unit 420 performs dimming processing to bring a luminance value of a pixel in the image data into "0" according to a predetermined rule, gradation on a lower luminance side can be secured. The pixel a luminance value of which is brought into "0" by the processing performed by the dimming processing unit 420 is displayed as a blank (black) in the display image. Thus, by bringing the luminance value of the pixel into "0", it is seen from the user that the pixel is thinned from the display image and it becomes dark. In the following description in the present description, processing to bring a luminance value of a pixel into 0 is expressed as "to thin a pixel" or "not to display a pixel".

Note that the dimming processing performed by the dimming processing unit 420 is processing suitable for a laser scanning type projection display system in which a color and luminance of each pixel can be set separately. In the following, a configuration and an operation of the light emitting unit 120 in a projection display system will be described. Then, an example of dimming processing performed by the dimming processing unit 420 will be described.

The image data on which the light adjustment processing is performed by the digital light adjustment processing unit 400 is temporarily held in a data buffer 115. Then, the image data is serially output to a light source driving unit 116.

The light source driving unit 116 includes a D/A conversion unit. The light source driving unit 116 applies a driving current to each semiconductor laser diode which is a light source of the light emitting unit 120 according to the image data and makes each semiconductor laser diode emit light at intended luminance. As a light source of the light emitting unit 120, a red laser diode, a blue laser diode, and a green laser diode are provided in order to acquire three colors, RGB (see FIG. 5 for detail configuration). Accordingly, as the light source driving unit 116, a red driver 116R, a green driver 116G, and a blue driver 116B are included. Light can be adjusted by increasing/decreasing a gain of a driving current applied to each semiconductor laser diode (see FIG. 8).

Figure 4:
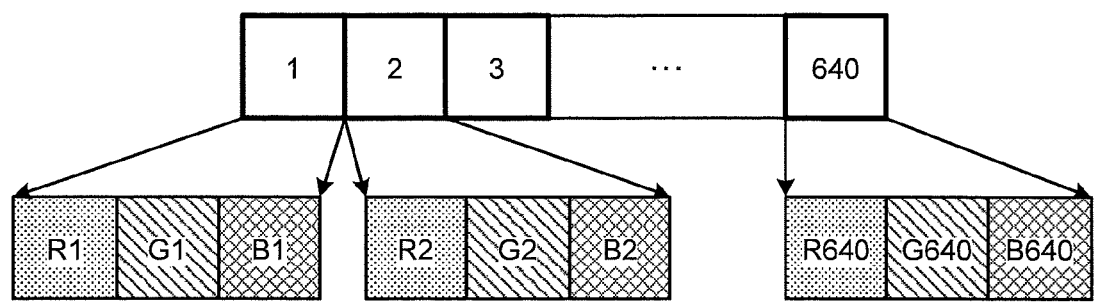
FIG. 4 is a view for describing a configuration of image data.

Note that as illustrated in FIG. 4, each piece of pixel data included in the image data of course includes color information configured by three colors of red (R), green (G), and blue (B) in each pixel. The drivers 116R, 116G, and 116B respectively apply current to the semiconductor laser diodes according to information of each color in each pixel and make the semiconductor laser diodes emit light at luminance corresponding to the color information.

Figure 5:
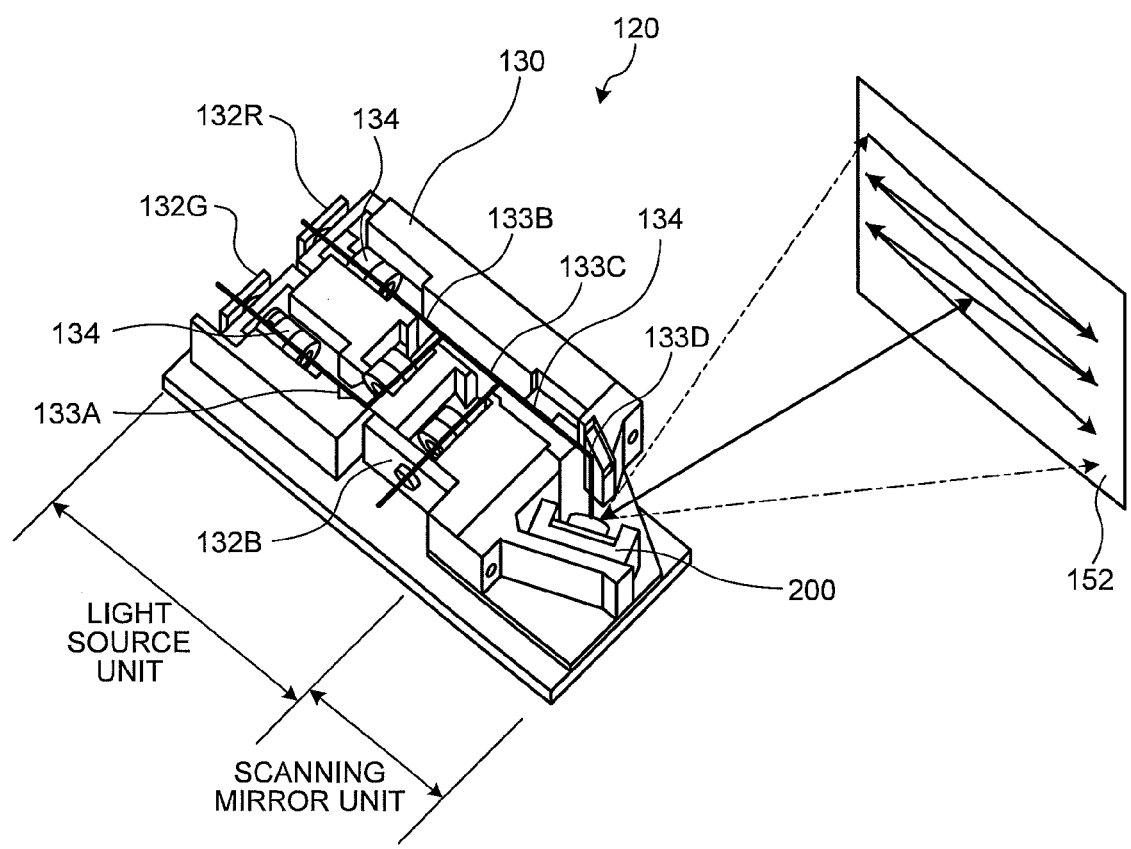
FIG. 5 is a perspective view of a light emitting unit.

The light emitting unit 120 includes a light source unit 130 and a scanning mirror unit 200. FIG. 5 is a perspective view of the light emitting unit 120. As an example, the light source unit 130 and the scanning mirror unit 200 are provided as a unit. The light source unit 130 includes laser diodes of three colors 132R, 132G, and 132B, a plurality of mirrors 133A, 133B, 133C, and 133D, and a plurality of condenser lenses 134.

As the laser diodes, the red laser diode 132R, the green laser diode 132G, and the blue laser diode 132B which respectively output red (R), green (G), and blue (B) laser beams are provided. Note that the present embodiment can be applied to a configuration using laser diodes of more than three colors and can be also applied to a configuration using laser diodes of one or two colors.

Each of the mirrors 133B and 133C is a dichroic mirror to transmit or reflect a color of a predetermined wavelength. An optical path of light output from the light source unit 130 will be described briefly. The first mirror 133A reflects, at a right angle, the green laser beam output from the green laser diode 132G and leads the reflected light to an optical path of the red laser. The second mirror 133B transmits the red laser beam output from the red laser diode 132R, reflects the green laser, and multiplexes the two. The third mirror 133C transmits the light from the second mirror 133B and reflects the blue laser beam output from the blue laser diode 132B. Thus, the three laser beams are multiplexed to one axis as a luminous flux and the luminous flux is made to enter the scanning mirror unit 200 at a predetermined angle by the fourth mirror 133D.

Note that the condenser lenses 134 are appropriately arranged on the optical path and collect the laser beams. An optical characteristic and an arrangement position of each condenser lens are determined by a relationship with the imaging optical system 150 in a next stage. Also, in FIG. 5, a circuit board is provided on a rear surface side of the light emitting unit 120. On the circuit board, the image signal processing unit 110, the timing processing unit 160, and the central control unit 180 are assembled and are, for example, modularized as a whole.

Next, a configuration of the scanning mirror unit 200 will be described. The scanning mirror unit 200 is a so-called micro electro mechanical systems (MEMS) device and is produced by applying a processing technique of a semiconductor integrated circuit. The scanning mirror unit 200 includes two oscillation shafts orthogonal to each other and can be driven in a dual-axis manner. The scanning mirror unit 200 includes a mirror on one surface. By oscillating the mirror, an image luminous flux in which the three laser beams are multiplexed to one axis and which is output from the light source unit 130 is reflected in such a manner that raster scanning is performed.

Figure 6A:
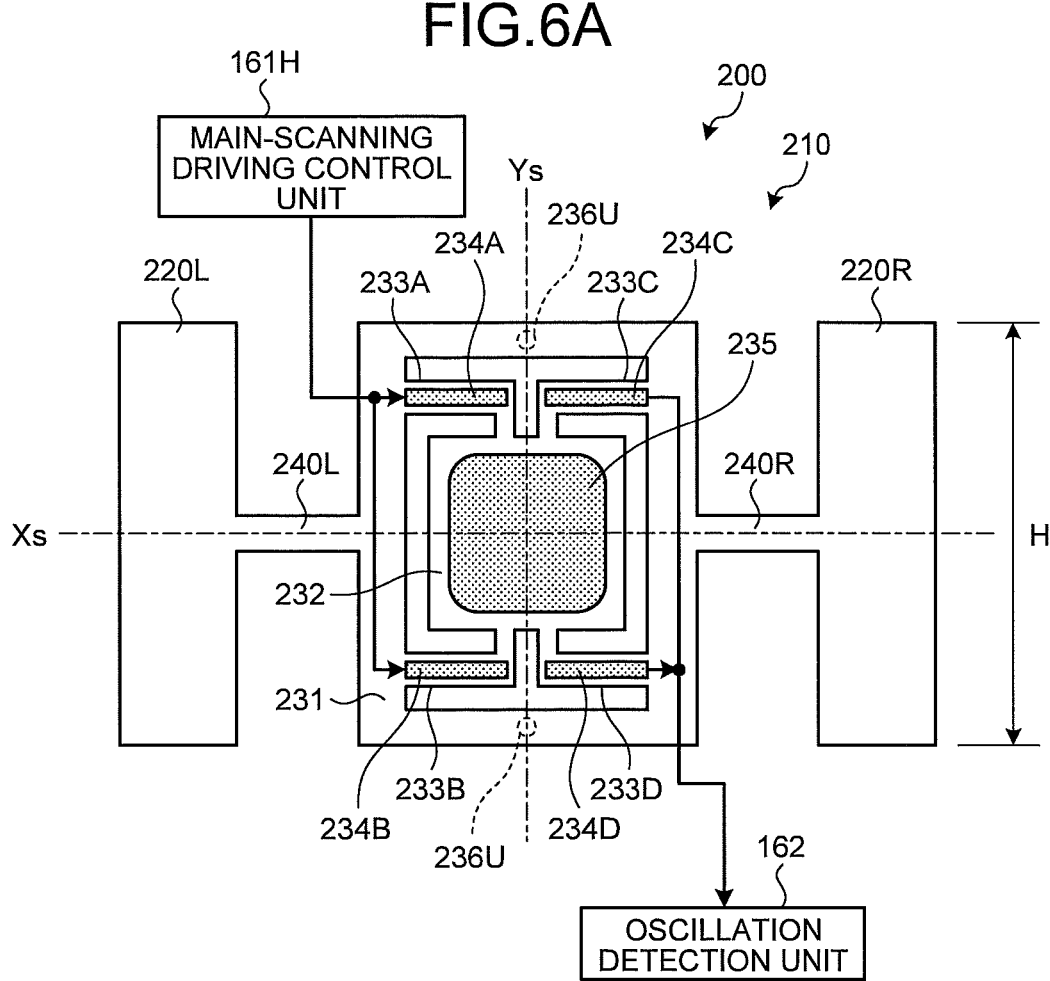
FIG. 6A is a plane view of a scanning mirror unit.
Figure 6B:
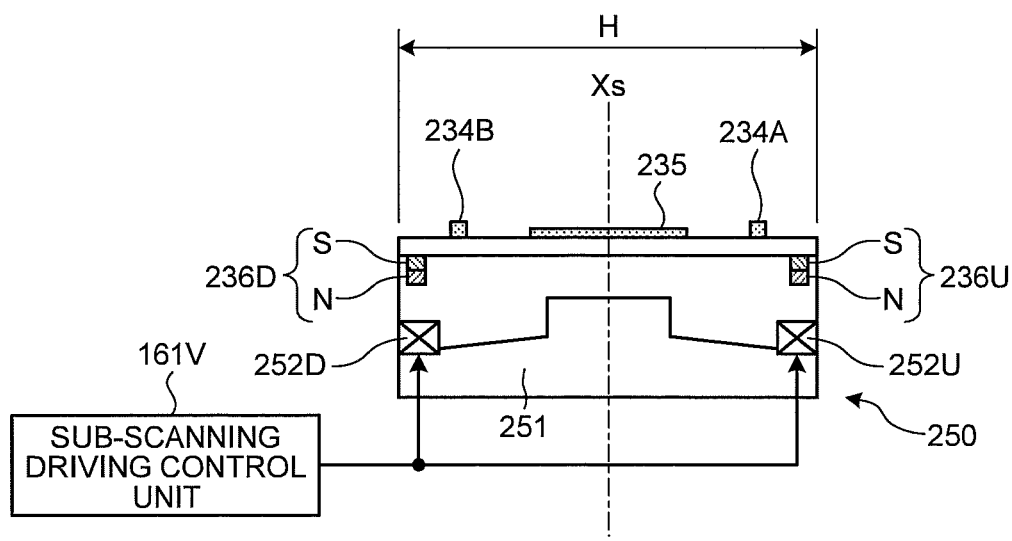
FIG. 6B is a sectional schematic view of the scanning mirror unit.

A typical structure of the scanning mirror unit 200 will be described with reference to FIG. 6A and FIG. 6B. FIG. 6A is a plane view of the scanning mirror unit 200 and FIG. 6B is a sectional schematic view thereof. Note that in the sectional schematic view in FIG. 6B, hatching is omitted to make it easy to see the drawing in a range in which no misunderstanding is caused. Note that for convenience of a description, the description will be made with an upward/downward direction in FIG. 6A as a y-axis direction and a right/left direction as an x-axis direction.

The scanning mirror unit 200 includes an optical deflection element 210 to perform dual-axis driving in such a manner that light is deflected in the main-scanning direction and the sub-scanning direction and a supporting base part 250 to support the optical deflection element 210. The optical deflection element 210 is manufactured from a silicon (Si) wafer by a well-known semiconductor process. The optical deflection element 210 includes two supporting parts 220L and 220R arranged at both ends in the x-axis direction in FIG. 6A, a sub-scanning oscillator body part 230 which oscillates, as a whole, in the sub-scanning direction between the supporting parts 220L and 220R, and two arms 240L and 240R to connect the two supporting parts 220L and 220R with the sub-scanning oscillator body part 230. The two arms 240L and 240R respectively connect the supporting parts 220L and 220R with the sub-scanning oscillator body part 230 around the center in the upward/downward direction. Accordingly, the sub-scanning oscillator body part 230 can oscillate with a sub-scanning oscillation shaft Xs as an oscillation shaft.

Next, the sub-scanning oscillator body part 230 includes a frame body 231 included in a frame, a main-scanning oscillator piece part 232 supported in the frame of the frame body 231 in a state of being separated from the frame body 231, four L-shaped beam parts 233A, 233B, 233C, and 233D to connect an inner periphery of the frame body 231 with the main-scanning oscillator piece part 232, four piezoelectric elements 234A, 234B, 234C, and 234D, a mirror 235, and two magnets 236U and 236D.

The L-shaped beam parts 233A, 233B, 233C, and 233D couple inner sides, which are in parallel with the y-axis, of the frame body 231 to sides, which are in parallel with the x-axis, of the main-scanning oscillator piece part 232. Here, the L-shaped beam parts 233A, 233B, 233C, and 233D are coupled, to the main-scanning oscillator piece part 232, at positions proximate to the center of the right and left of the main-scanning oscillator piece part 232. Accordingly, it is possible to oscillate the main-scanning oscillator piece part 232 with a main-scanning oscillator shaft Ys as an oscillation shaft.

Then, in the four L-shaped beam parts 233A, 233B, 233C, and 233D, the piezoelectric elements 234A, 234B, 234C, and 234D are arranged at parts in parallel with the x-axis. Each of the piezoelectric elements 234A, 234B, 234C, and 234D is not illustrated in detail but is a laminate structure in which a piezoelectric film is sandwiched between a lower electrode and an upper electrode.

The mirror 235 is formed on one surface of the main-scanning oscillator piece part 232. The mirror 235 can be formed by deposition of a metal with high reflectivity (such as Al or Au). As it is obvious from the above-described structure, the mirror 235 oscillates in the sub-scanning direction by the support by the arms 240L and 240R. Also, the mirror 235 can oscillate in the main-scanning direction by the support by the L-shaped beam parts 233A, 233B, 233C, and 233D.

The two magnets 236U and 236D are respectively arranged upward and downward along the y-axis in the main-scanning oscillator piece part 232. When it is assumed that the surface on which the mirror 235 is formed is an front surface, the magnets 236U and 236D are pasted on a rear surface of the sub-scanning oscillator body part 230.

The supporting base part 250 includes a base part 251 and two magnet coils 252U and 252D. The magnet coils 252U and 252D are arranged in such a manner as to be respectively paired with the magnets 236U and 236D.

Finally, electric wiring will be described. Among the four piezoelectric elements 234A, 234B, 234C, and 234D provided, the two piezoelectric elements 234A and 234B induce oscillation of the main-scanning oscillator piece part 232 and the two piezoelectric elements 234C and 234D detect the oscillation of the main-scanning oscillator piece part 232. That is, in FIG. 6A, to each of the two piezoelectric elements for driving 234A and 234B arranged on a left side of the main-scanning oscillator shaft Ys, a driving signal is applied. Then, oscillation of the two piezoelectric elements for driving 234A and 234B on the left side is transmitted to the main-scanning oscillator piece part 232 through the L-shaped beam parts 233A and 233B and the main-scanning oscillator piece part 232 oscillates with the main-scanning oscillator shaft Ys as the oscillation shaft. Also, each of the two piezoelectric elements for detection 234C and 234D arranged on a right side of the main-scanning oscillator shaft Ys detects oscillation of the main-scanning oscillator piece part 232.

Here, a driving voltage signal having a predetermined phase difference with respect to an oscillation detection signal acquired from each of the piezoelectric elements for detection 234C and 234D is fed back to the piezoelectric elements for driving 234A and 234B, whereby it is possible to perform resonance driving of the main-scanning oscillator piece part 232.

Also, to each of the magnet coils 252U and 252D, a driving current to oscillate the sub-scanning oscillator body part 230 is applied in a predetermined cycle. Accordingly, the magnet coils 252U and 252D and the magnets 236U and 236D repel and attract alternately and the sub-scanning oscillator body part 230 oscillates with the sub-scanning oscillation shaft Xs as the oscillation shaft. The oscillation in the sub-scanning direction is non-resonance driving and is adjusted in a cycle of vertical driving of the image data.

Figure 7:
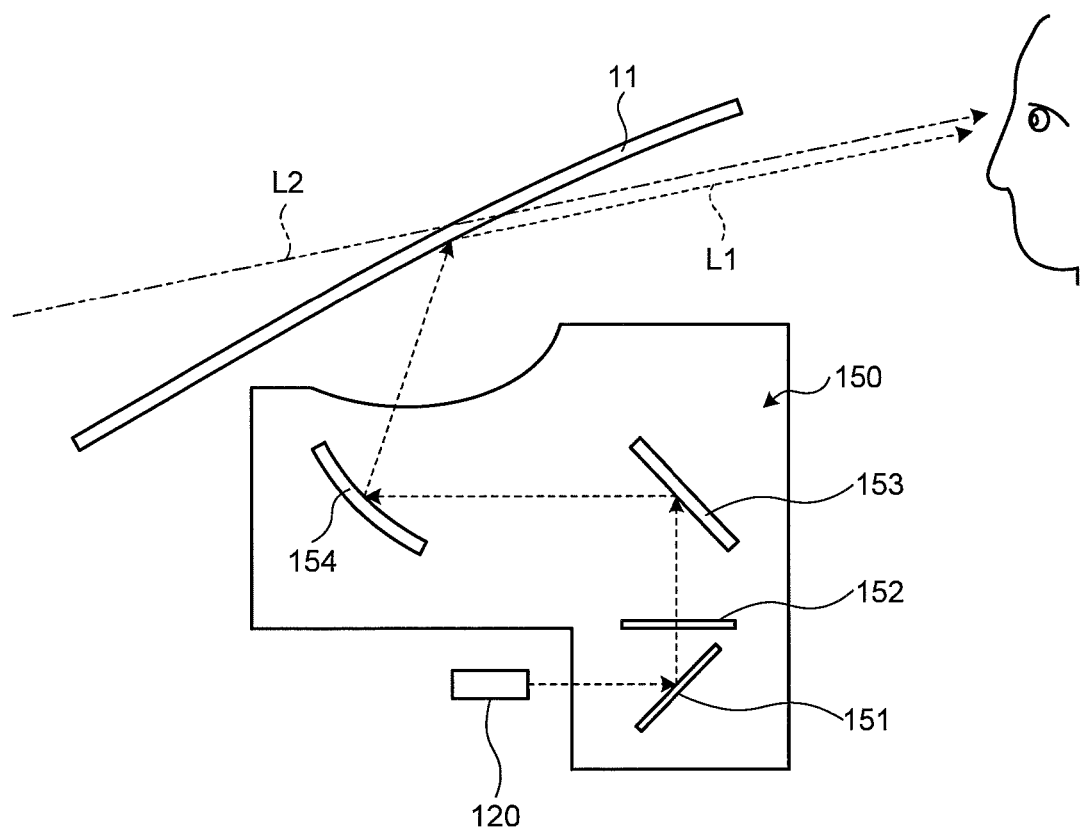
FIG. 7 is a view illustrating an optical path through which an image luminous flux L1 emitted from the light emitting unit passes before reaching an eye of a viewer.

Next, an imaging optical system 150 will be described. FIG. 7 is a view schematically illustrating an optical path through which the image luminous flux L1 emitted from the light emitting unit 120 passes before reaching an eye of the driver P. Note that a configuration of the imaging optical system 150 only needs to be what leads the image luminous flux L1 emitted from the light emitting unit 120 to an eye of a viewer and is not limited to a specific configuration.

The imaging optical system 150 includes a plane mirror 151, a micro lens array 152, a plane mirror 153, and a recessed mirror 154. Also, in FIG. 7, the windscreen 11 is also illustrated as a combiner.

The micro lens array 152 is a transmission-type, micro lenses being arrayed therein in matrix. The micro lens array 152 reduces a speckle of a laser and is designed optimally in consideration of an angle of radiation or color unevenness. Then, a laser beam is diffused (emitted) by the micro lens array 152, whereby laser intensity per unit area is decreased. Accordingly, stress on an eye is reduced and it is safe even when a luminous flux enters an eye.

The luminous flux L1 reflected by the scanning mirror unit 200 temporarily forms an intermediate image on the micro lens array 152. Then, the image luminous flux L1 is reflected by the plane mirror 153, the recessed mirror 154, and the windscreen 11 and reaches an eye of a viewer. Also, in the windscreen 11 as a combiner, the image luminous flux L1 and the actual external view are overlaid.

Note that although not illustrated in FIG. 7, a neutral density (ND) filter which can be inserted/removed is provided to the imaging optical system 150, whereby light can be adjusted. In a table in FIG. 8, an example of using a neutral density (ND) filter with transmittance of one-eighth is illustrated.

Next, the timing processing unit 160 will be described. The timing processing unit 160 includes a mirror driving control circuit 161, an oscillation detection unit 162, and a timing adjustment unit 170. Here, timing processing is necessary for main-scanning driving control of the scanning mirror unit 200, sub-scanning driving control of the scanning mirror unit 200, and generation of a timing signal to match image processing timing in the image signal processing unit 110 to driving of the scanning mirror unit 200.

The mirror driving control circuit 161 includes a main-scanning driving control unit 161H to perform the main-scanning driving control of the scanning mirror unit 200 and a sub-scanning driving control unit 161V to perform the sub-scanning driving control of the scanning mirror unit 200.

The main-scanning driving control of the scanning mirror unit 200 will be described. A detection signal from each of the piezoelectric elements for detection 234C and 234D of the scanning mirror unit 200 is detected by the oscillation detection unit 162. The oscillation detection unit 162 includes, for example, an amplification circuit or a filter. A detected oscillation detection signal Sn is fed back to the main-scanning driving control unit 161H. Then, phase adjustment is performed in such a manner that the scanning mirror unit 200 resonates in the main-scanning direction and application as a main-scanning driving signal SH to the piezoelectric elements for driving 234A and 234B is performed. Accordingly, resonance driving of the scanning mirror unit 200 is performed in the main-scanning direction.

On the other hand, the sub-scanning driving control unit 161V makes the scanning mirror unit 200 perform non-resonance driving in the sub-scanning direction in a cycle of the vertical driving of the image data. For example, in a case of a VGA, an oscillation frequency in the sub-scanning direction is 60 Hz. The sub-scanning driving control unit 161V outputs, at timing of an output of the main-scanning driving signal SH from the main-scanning driving control unit 161H, a sub-scanning driving signal SV to oscillate the scanning mirror unit 200 in the sub-scanning direction at 60 Hz.

The timing adjustment unit 170 performs timing processing in such a manner that an operation of a memory controller matches the driving of the scanning mirror unit. More specifically, a resonance frequency in the main-scanning direction of the scanning mirror unit is multiplied and a dot clock is generated. The dot clock is supplied as a timing signal to the reading unit 113R, the RGB data buffer 115, and the light source driving unit 116.

An operation in which drawing is performed based on the timing signal (dot clock or display period instruction signal) generated in such a manner will be described step by step. First, the reading unit 113R reads image data by one line at timing of the dot clock and outputs the read image data to the RGB data buffer 115. The image data temporarily stored in the RGB data buffer 115 is transmitted to the light source driving unit 116 in order. Then, the semiconductor laser diode of each color is driven and emits light at luminance instructed by the image data. The driving of luminance of each color, the driving of main-scanning, and the driving of sub-scanning are synchronized, whereby each pixel is drawn appropriately and intended image data is drawn.

The central control unit 180 controls an operation of the whole image display apparatus 100. Specifically, in the present embodiment, the central control unit 180 sets a light adjustment level of an image. The central control unit 180 includes a light adjustment level setting unit 181. Into the light adjustment level setting unit 181, a sensor value from an external light sensor 300 is input. A table to determine a light adjustment level corresponding to brightness of external light is previously stored in the light adjustment level setting unit 181. The light adjustment level setting unit 181 determines the light adjustment level according to brightness of the external light. Also, the light adjustment level setting unit 181 selects a light adjustment level according to a predetermined rule depending on display contents. For example, the light adjustment level setting unit 181 displays an emergency alarm with the maximum brightness.

Dimming Processing by Dimming Processing Unit

First Dimming Processing

Dimming processing performed by the dimming processing unit 420 will be described. In the present embodiment, there are two stages in the dimming processing. First, first dimming processing which is the first of the two stages will be described.

The image display apparatus 100 makes the scanning mirror 235 perform reciprocating oscillation to the right and the left and draws a scanning line in the horizontal direction. At the same time, by making the scanning mirror 235 perform reciprocating oscillation in the vertical direction for the number of scanning lines included in an image, the image display apparatus 100 displays an image. In this display system, there are a scanning line of a going path and that of a returning path in the horizontal direction. Thus, it is possible to reduce a half of brightness of an image by performing a control in such a manner that the scanning line of one of the going path and the returning path is not displayed (bring luminance value into "0").

Figure 10:
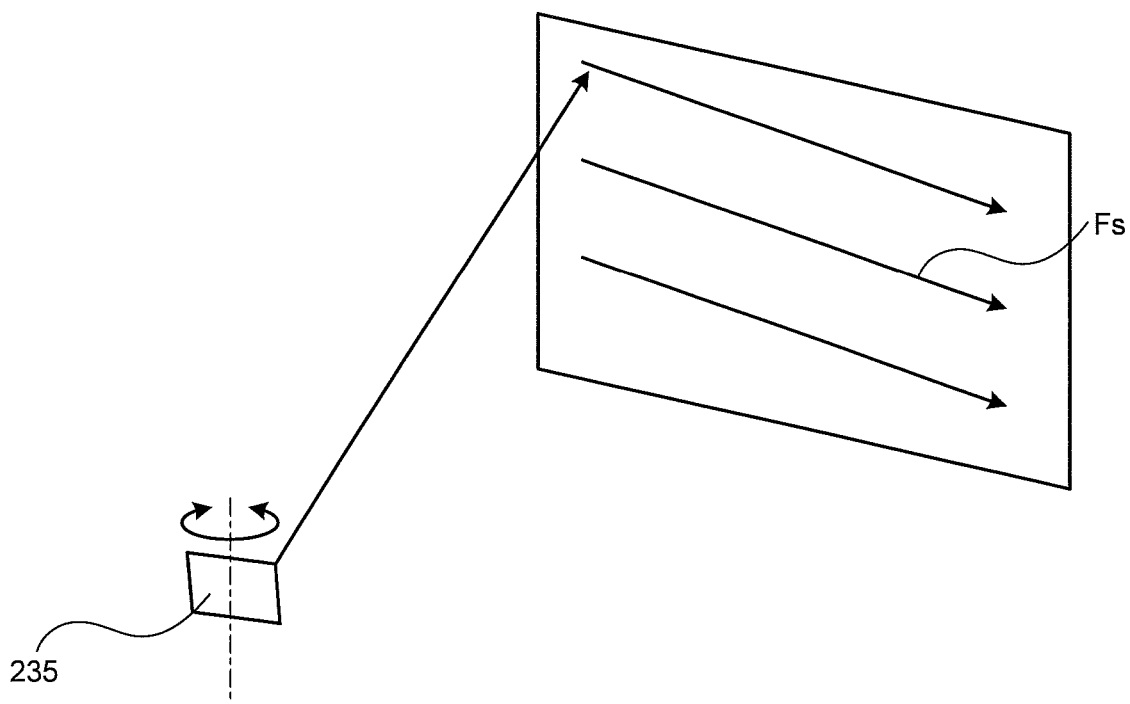
FIG. 10 is a view illustrating a display operation to perform drawing only in a going path Fs.

Scanning in which laser scanning in the returning path is thinned will be described. In FIG. 9, a state of thinning image data in a scanning line corresponding to the returning path and performing a display is illustrated. In the first dimming processing, a luminance value of a pixel of image data corresponding to the scanning line of the returning path is brought into 0 and processing to thin the scanning line of the returning path is performed. Accordingly, laser emission is not performed when the returning path is scanned with the mirror 235. Then, as illustrated in FIG. 10, drawing is performed only in a case of the going path Fs and drawing is not performed in a case of the returning path. In FIG. 5, a state of normal drawing is illustrated. It can be understood that a half of display luminance is reduced since drawing of the returning path is not performed.

An oscillation cycle in each of the horizontal direction and the vertical direction of the mirror 235 is not changed by the first dimming processing. Thus, it is possible to perform a display without changing, for example, a frame rate for displaying the image data.

Unlike a flat display panel using a method of making an entire screen emit light simultaneously with a backlight or the like, a drawing point is drawn one by one in a laser scanning type projection display. In a case of the flat display panel, the whole surface emits light simultaneously. Thus, it is possible to perform adjustment of brightness of the screen and adjustment of resolution thereof separately. However, it is difficult to set luminance of each pixel in detail.

According to the first dimming processing, laser emission is performed in a small degree within a range in which a laser output can be controlled with good gradation. Thus, it is possible to reduce brightness to a half (0.5) while keeping gradation of a display image. In such a manner, it is possible to reduce whole luminance while keeping image quality in the laser scanning type projection display.

Second Dimming Processing

Then, second dimming processing which is the second of the two stages will be described. The second dimming processing is processing to generate an image which is one stage darker than an image on which the first dimming processing is performed. In the second dimming processing, a pixel is further thinned from the image on which the first dimming processing is performed. Here, every other pixel is thinned in a scanning line of the going path.

Figure 11:
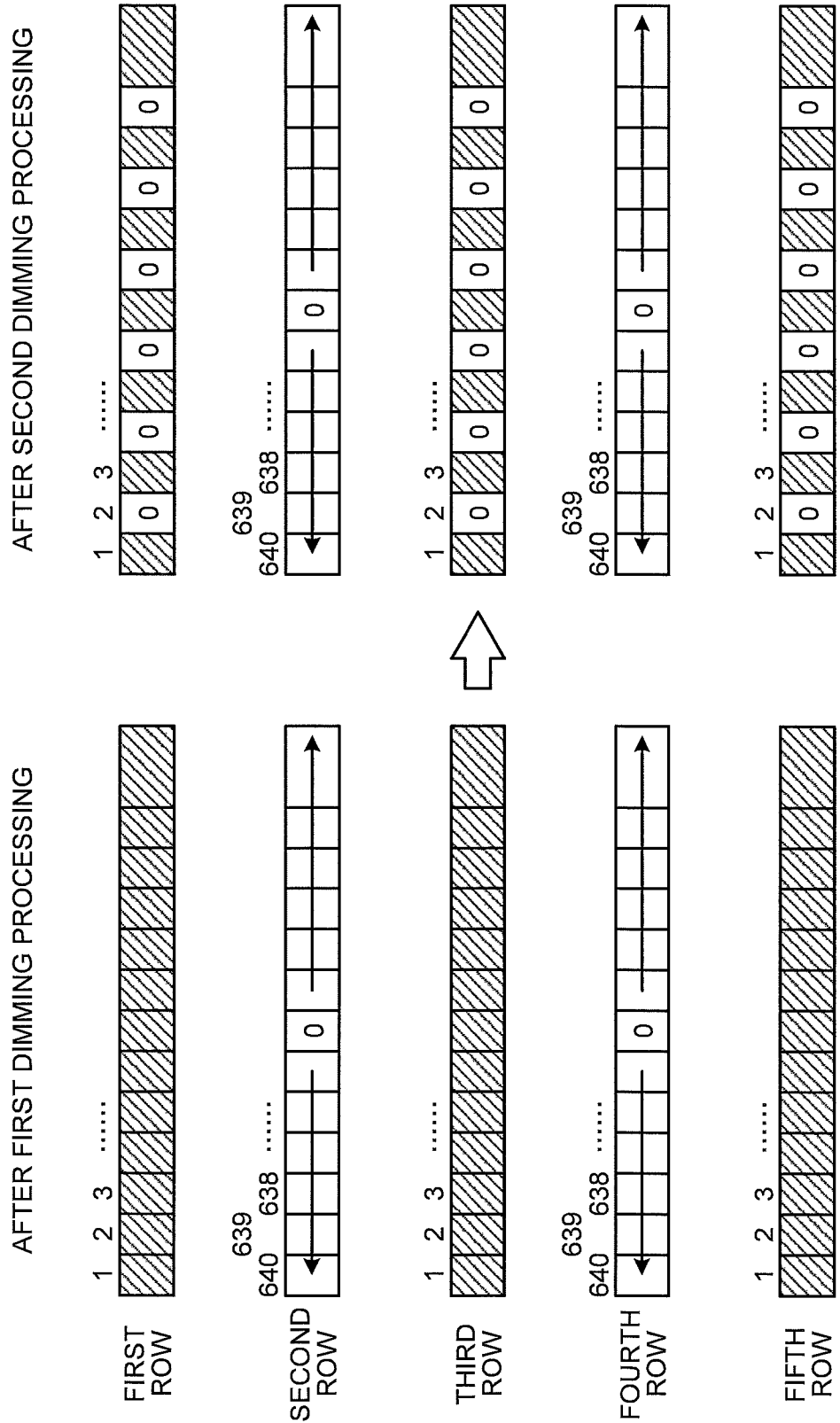
FIG. 11 is a view illustrating a state in which a pixel value of a pixel is alternately thinned in image data in a scanning line corresponding to a going path by second dimming processing.
Figure 12:
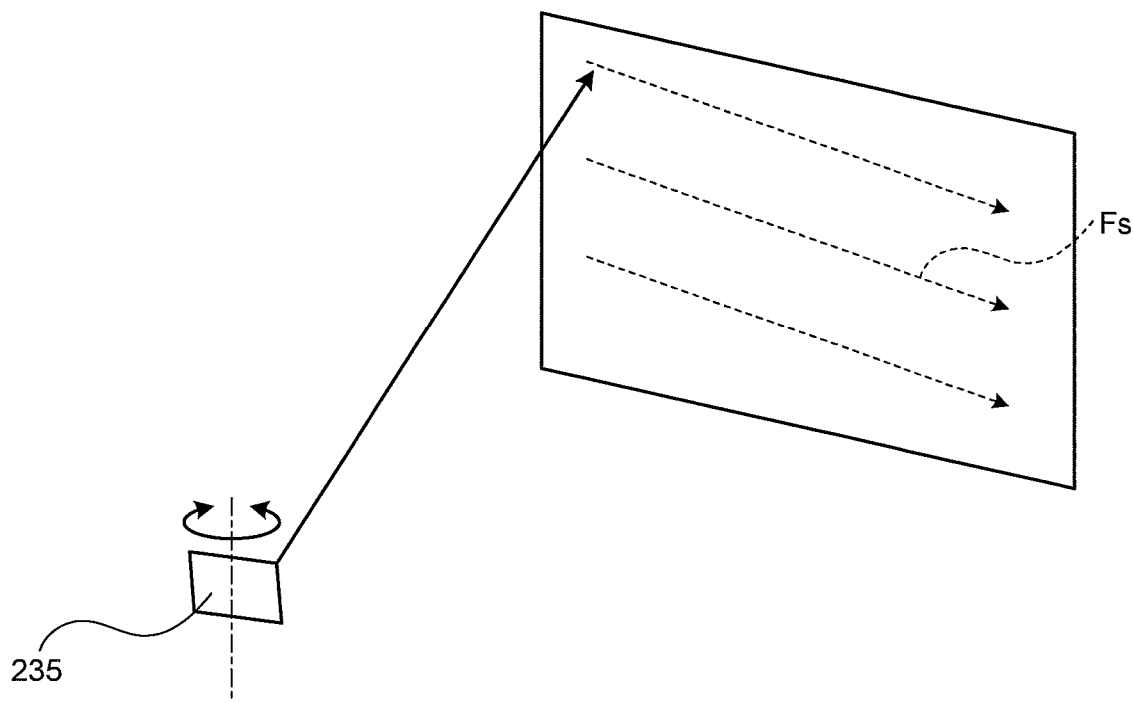
FIG. 12 is a view illustrating a display operation in which drawing points are at intervals in the going path Fs.

In FIG. 11, a state in which a pixel value of every other pixel is thinned in image data of a scanning line corresponding to the going path is illustrated. When the image data is thinned in such a manner, drawing points are arranged at intervals in the going path. (In FIG. 12, it is expressed that drawing points are at intervals in the going path Fs.) By the second dimming processing, brightness of an image is further reduced to a half (0.5) of that in the first dimming processing. (That is, the brightness is reduced to one-fourth (0.25) of a normal display.)

In such a manner, by thinning whole pixel information in a scanning line of the going path or the returning path or by thinning pixel information of a part of pixels, it becomes possible to secure a light adjustment level for two stages (for two bit) on a darker side.

First Modification

Figure 13:
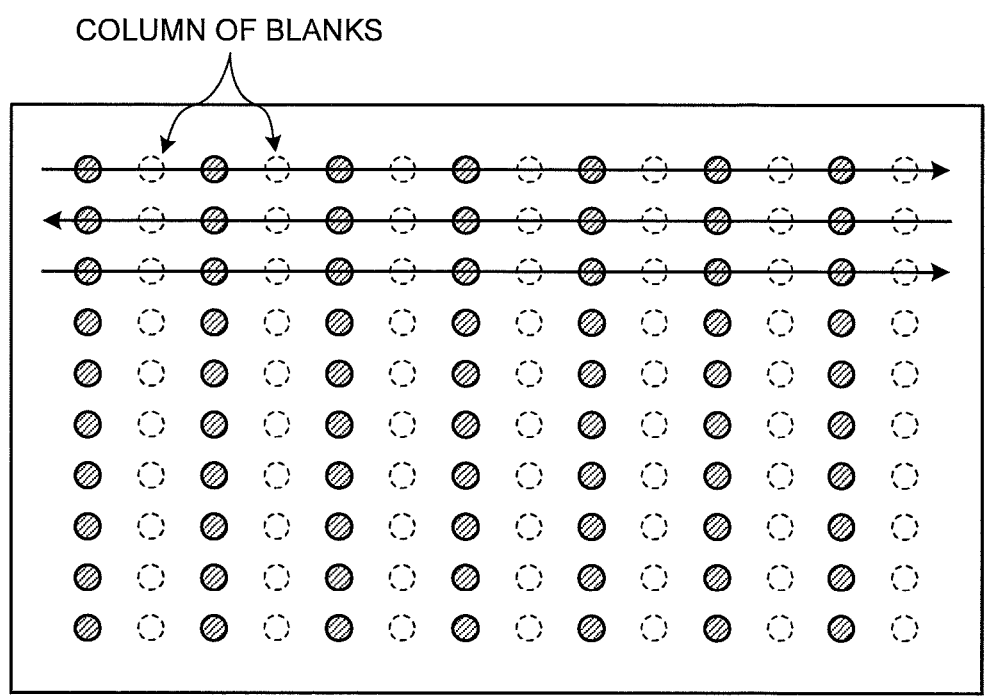
FIG. 13 is a view illustrating an example of thinning pixels in such a manner that blanks are lined up in a vertical direction.

In the above-described example, pixel information in a scanning line (scanning line of returning path) in a horizontal direction is thinned and a going path is thinned at intervals, whereby dimming for two stages is performed. However, various ways of thinning a pixel are considered. For example, a pixel may be thinned in such a manner that blanks are lined up in a vertical direction (see FIG. 13). Also, thinning may be performed alternately in the going path and the returning path (see FIG. 14).

Figure 14:
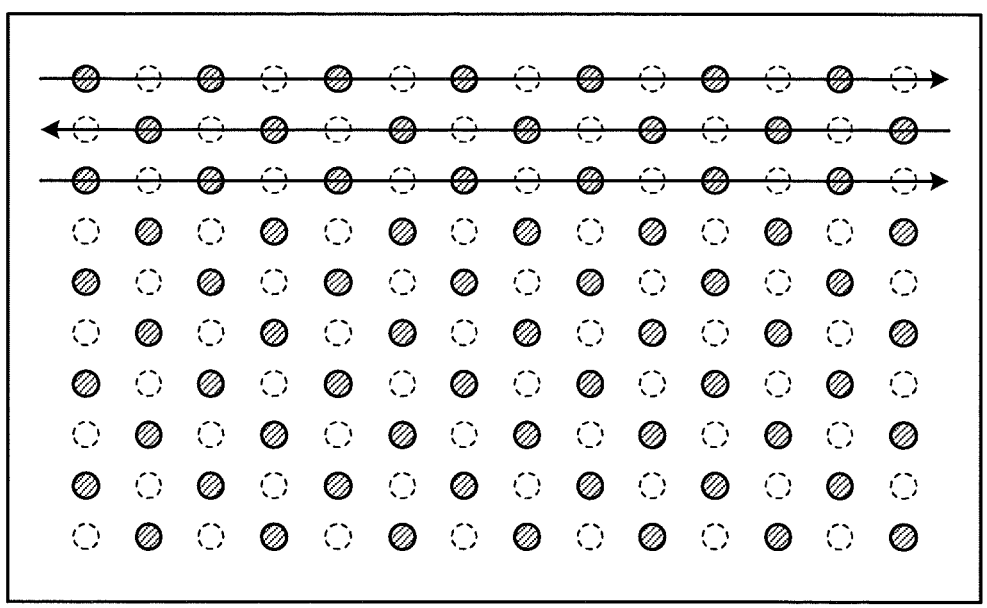
FIG. 14 is a view illustrating an example of performing thinning in going path and returning path alternately.

Even when a pixel is thinned, it is desired to keep resolution as much as possible. Thus, it is not preferable that a plurality of adjoining pixels is thinned (brought into blank) collectively. It is because an image becomes rough. For example, FIG. 14 is a typical example. It is preferable that pixels are thinned at intervals in such a manner that an image does not become rough as much as possible.

Note that the present invention is not limited to the above-described embodiments and can be modified appropriately within the scope of the spirit. For example, in the above-described description, a MEMS mirror which can be integrally driven in a dual-axis manner has been described as an example of the scanning mirror unit. However, the above-described example is not the limitation and various modifications can be made. For example, a mirror which oscillates in a horizontal direction and a mirror which oscillates in a vertical direction may be provided separately.

The image display apparatus is not limited to an in-vehicle type head-up display but may be applied to a head-mount display such as a type embedded in a helmet or a type of glasses. That is, assumption of the present invention is not limited to a case of being mounted in a four-wheeled automobile. For example, an image display apparatus in a type embedded to a helmet may be assumed and a driver of a motorcycle may wear the helmet.

An image display apparatus according to the present invention is useful, for example, to a laser scanning type projection display.

According to the present invention, it is possible to adjust a wide range of light adjustment level while keeping image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image display apparatus comprising:
   a laser light source unit configured to output a luminous flux;
   a scanning mirror unit configured to reflect the luminous flux by reciprocating driving in a main-scanning direction and a sub-scanning direction;
   a light source driving unit configured to drive the laser light source unit based on image data;
   a bit shift processing unit configured to adjust a brightness value of a pixel included in the image data; and
   a dimming processing unit configured to perform control in such a manner that a brightness value of a pixel included in the image data is displayed as zero with respect to the image data subjected to dimming processing by the bit shift processing unit according to a predetermined rule;
   an external light sensor;
   a light adjustment level setting unit configured to determine a light adjustment level based on a sensor value from the external light sensor; and
   a table that is stored in the light adjustment level setting unit and used to determine the light adjustment level, wherein
   the image display apparatus is configured to perform an adjustment of relative brightness corresponding to brightness of external light by at least combining one or more of a gain adjustment in which increasing or decreasing a gain of a driving current applied to the laser light source unit is performed by the light source driving unit, a bit shift operation in which adjusting the brightness value of the pixel is performed by the bit shift processing unit, and dimming processing performed by the dimming processing unit in which the brightness value of the pixel is brought to zero according to the predetermined rule.

2. The image display apparatus according to claim 1, wherein the dimming processing unit performs control in such a manner that a brightness value of a scanning line in either a going path or a returning path of the scanning mirror unit is displayed as zero.

3. The image display apparatus according to claim 1, wherein the dimming processing unit performs control in such a manner that a brightness value of every other pixel is displayed as zero on a scanning line in the main-scanning direction.

4. The image display apparatus according to claim 3, wherein the dimming processing unit performs control in such a manner that pixels, whose brightness values are zero, are displayed not to line up in a vertical direction in a scanning line of a going path in the main-scanning direction and a scanning line of a returning path in the main-scanning direction.

5. The image display apparatus according to claim 1, wherein
   when the sensor value is smaller than a predetermined value, the bit shift processing unit decreases the brightness value of the pixel and the dimming processing unit brings the brightness value of the pixel reduced by the bit shift processing unit to zero, and
   when the sensor value is larger than the predetermined value, the bit shift processing unit increases the brightness value of the pixel and the dimming processing unit does not perform the dimming processing in which the brightness value of the pixel adjusted by the bit shift processing unit is brought to zero.

\* \* \* \* \*